United States Patent [19]

Feichtmeir et al.

[11] Patent Number: 4,931,113
[45] Date of Patent: Jun. 5, 1990

[54] VENEER EDGE JOINDER METHOD AND APPARATUS

[75] Inventors: Raymond A. Feichtmeir, San Francisco, Calif.; LeRoy E. Cothrell, Gresham, Oreg.; Jack E. Moon, Nampa, Id.; Ted R. Turner, Hines, Oreg.

[73] Assignee: Tecton Laminates Corp., Hines, Oreg.

[21] Appl. No.: 321,106

[22] Filed: Mar. 9, 1989

[51] Int. Cl.$^5$ .............................................. B27D 1/00
[52] U.S. Cl. ..................................... 156/64; 156/258; 156/304.5; 156/362; 156/364; 156/558
[58] Field of Search ..................... 156/258, 304.5, 362, 156/360, 361, 544, 546, 64, 557, 558, 559; 198/502.2, 575, 689.1, 460, 462; 144/2 R, 344, 345, 346, 348, 355, 356, 357

[56] References Cited

U.S. PATENT DOCUMENTS

| | | | |
|---|---|---|---|
| 1,473,733 | 11/1923 | Norris . | |
| 2,871,896 | 2/1959 | Markwell | 144/309 |
| 2,894,545 | 7/1959 | Wirth | 144/125 |
| 3,131,737 | 5/1964 | Pearl | 144/281 |
| 3,133,850 | 5/1964 | Alenius | 156/558 |
| 3,147,782 | 9/1964 | Pearl | 144/124 |
| 3,268,383 | 8/1966 | Fischer | 156/558 |
| 3,461,932 | 8/1969 | Shelton et al. | 144/348 |
| 3,562,045 | 2/1971 | Hasegawa | 156/159 |
| 4,466,856 | 8/1984 | Paakki | 156/558 |
| 4,608,106 | 8/1986 | Lahtinen | 156/182 |
| 4,804,081 | 2/1989 | Lenhardt | 198/689.1 |
| 4,841,907 | 6/1989 | Otsuka | 156/258 X |

Primary Examiner—David Simmons
Assistant Examiner—Chester T. Barry
Attorney, Agent, or Firm—Kolisch, Hartwell & Dickinson

[57] ABSTRACT

Veneer edge treatment method and apparatus are described. The apparatus includes plural work stations distributed along the length of elongate conveyor means for transporting the veneer sheets as a series into and out of the work stations, with each work station having means for working on at least one of opposed terminal edges of a veneer sheet occupying the station. Selectively controllable scarfing, glue-applying and bonding work stations are provided, and the selectively controllable conveyor sections extending thereinto, therebetween and therefrom are vacuum-assisted to maintain alignment of the veneer sheets transported thereby. Sensing means and control means measure the distances between the opposed terminal edges of successive veneer sheets and determine their lengths, permitting the apparatus to handle veneer sheets or different lengths. In the preferred embodiment, the scarfing station includes dual circular saws pivotably mounted on a laterally reciprocable carriage for scarfing the leading and trailing edges of adjacent veneer sheets. In the preferred embodiment, the trailing edge of a downstream veneer sheet has glue applied to it while the leading edge of the same veneer sheet is being bonded with the trailing edge of the length of edge-joined veneer formed by the apparatus.

7 Claims, 4 Drawing Sheets

VENEER EDGE JOINDER METHOD AND APPARATUS

BACKGROUND AND SUMMARY OF THE INVENTION

This invention relates generally to veneer edge-treatment method and apparatus. More specifically, it concerns a method and an apparatus for joining together the opposite, terminal edges of successive veneer sheets to form a continuous length of veneer.

Veneer edge-joining equipment conventionally has been provided only in a piecemeal fashion. For example, prior art equipment provides only for the scarfing of veneer sheets, or only for the scarfing and gluing of veneer sheets, or only for the edge bonding of veneer sheets, but not for the orchestrated movement of individual veneer sheets through successive work stations having edge scarfing and bonding means for the joinder of sheets into a continuous length of veneer. The seemingly simple expedient of piecing together, in a series of upstream-to-downstream-arrayed edge-treatment stations, is fraught with difficulty and produces a system that is not optimally configured for either maximum throughput or minimum floor space ('footprint'). That is because particular edge-treatment operations efficiently may be performed concurrently on either end of an individual veneer sheet, while others efficiently may be performed concurrently on one end only of each of plural veneer sheets. Further, the reduction of waste of, and thus the maximization of yield from, the veneer sheets in their formation into a continuous length of veneer requires the length determination of each veneer sheet and the tracking of veneer sheets of various lengths through the plural work station, edge-joinder apparatus.

Accordingly, it is a principal object of the present invention to provide apparatus for edge-joining veneer sheets to form a continuous length of veneer, wherein the tradeoffs among yield, throughput and footprint are optimized.

Another object of the invention is to provide such apparatus which maintains the alignment of individual veneer sheets as they are advanced through the edge-joining process.

Yet another object is to provide apparatus that is capable of handling individual veneer sheets of different lengths and minimizing waste that conventionally results from the scarfing operation.

A further object of the invention is to provide apparatus having plural work stations, each capable of performing an edge-treatment operation on at least one edge of an individual veneer sheet positioned therein, wherein the work stations are independently, selectively controllable for fully automatic operation.

A still further object of the invention is to provide such apparatus cost-effectively.

These and other objects and advantages of the invention will become more fully apparent when the detailed description is read with reference to the accompanying drawings.

DETAILED DESCRIPTION OF THE PREFERRED EMBODIMENT

Figure 1:
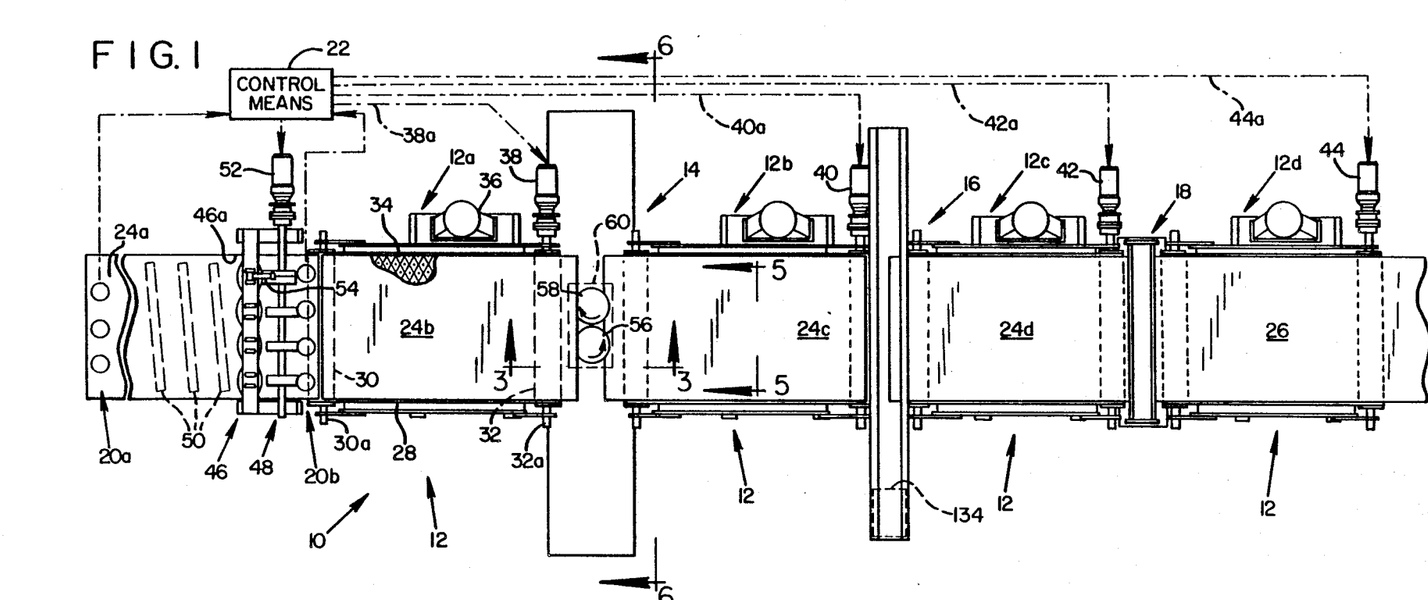
FIG. 1 is a top view of the veneer sheet edge-joining apparatus made in accordance with the preferred embodiment of the invention.
Figure 2:
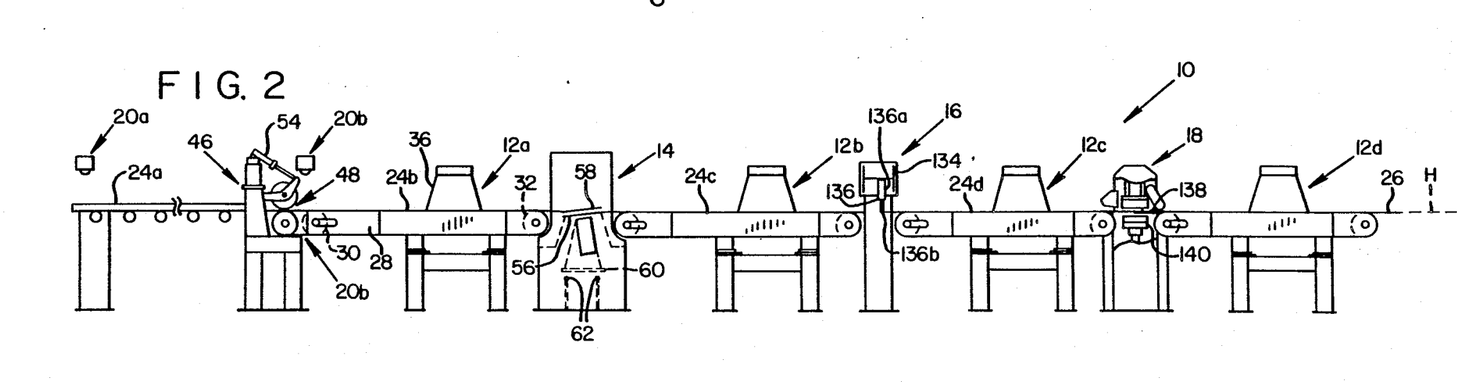
FIG. 2 is a side elevation of the apparatus corresponding to FIG. 1.

First it is noted that, throughout the illustrated description of the preferred embodiment of the invention, individual veneer sheets are advanced ('flow') in a direction from 'upstream' to 'downstream', or from left to right in FIGS. 1 and 2. Referring to FIGS. 1 and 2, the apparatus of the invention and its preferred embodiment is indicated generally at 10. Apparatus 10 comprises elongate conveyor means 12 including conveyor sections 12a, 12b, 12c, 12d; plural veneer sheet edge-treatment work stations 14, 16, 18 distributed along the length of conveyor means 12; sensing means 20a, 20b; and control means illustrated schematically at 22 (in FIG. 1 only). Conveyor means 12a, 12b, 12c, 12d; work stations 14, 16, 18; and sensing means 20a, 20b are positioned and oriented generally in-line for the edge joining of veneer sheets 24a (shown fragmentarily), 24b, 24c, 24d that enter apparatus 10 upstream (to the left in FIGS. 1 and 2) to form a continuous length of veneer 26 that exits apparatus 10 downstream (to the right in FIGS. 1 and 2). Conveyor sections 12a, 12b, 12c, 12d and work stations 14, 16, 18 are frame-mounted and rest stationarily on a preferably level surface, with their operative, veneer sheet-handling heights thereabove (nominally indicated by a dashed line H in FIG. 2) incrementally decreasing in a downstream direction (from left to right in FIGS. 1 and 2). This variation in heights, which is discernible in FIG. 2, accommodates the natural bending, under the force of gravity, of the leading edges of veneer sheets exiting the conveyor sections and the work stations.

Conveyor sections 12a, 12b, 12c, 12d, in their preferred embodiment, are identical except that they are of different longitudinal extents For example, conveyor sections 12a, 12b are preferably approximately seven feet long (as measured between their rollers' central axes) whereas conveyor sections 12c, 12d are preferably approximately six feet, one and one-half inches long. These dimensions accommodate the pre- and post-scarf lengths of veneer sheets having pre-treatment lengths of between approximately ninety-six inches and one-hundred and one inches. It will be appreciated that conveyor section 12a transports successive veneer sheets such as veneer sheet 24b into a scarfing work station 14; that conveyor sections 12b, 12c interpose work stations 14, 16, 18 for transporting veneer sheets such as veneer sheets 24c, 24d from one to another; and that conveyor section 12d extends downstream from a bonding work station 18. The operation of conveyor sections 12a, 12b, 12c, 12d is controlled, by control means 22 that is responsive to sensing means 20a, 20b, whereby veneer sheets in a series of sheets, e.g. sheets 24b, 24c, 24d and continuous length of veneer 26, transported thereby have their leading and trailing edges properly positioned to be operated on by the respective work stations 14, 16, 18. The following discussion of conveyor section 12a will be understood to apply generally to conveyor sections 12a, 12b, 12c, 12d.

Conveyor section 12a includes a manifold 28 bounded at its upstream and downstream ends by an idler roller 30 and a driven roller 32 having central axes 30a, 32a indicated by dash-dot lines. Extending arcuately around rollers 30, 32 and along the upper and lower, planar extents of manifold 28 is a continuous conveyor belt 34, which is suitably apertured substantially over its entire surface, as shown fragmentarily in cutaway detail in FIG. 1. Manifold 28 is negatively pressurized to a predetermined static vacuum by venting the space enclosed thereby, with duct 36, for example, and is connected to an exhaust means (not shown). The upper, planar, extent of apertured conveyor belt 34 thus provides, in cooperation with the negatively pressurized space beneath it, vacuum means for holding veneer sheet 24b on conveyor section 12a with veneer sheet 24b nondisplaceable thereon. This is particularly important in the apparatus disclosed because of the need to have veneer sheets accurately positioned in the work stations, with the positions selectively controlled by predetermined veneer sheet length measurements.

Roller 32 is driven by a ten horsepower, AC servo motor 38, and its frictional engagement with conveyor belt 34 causes the belt to rotate (in a clockwise direction in FIG. 2). This rotation advances veneer sheet 24b downstream. Control means 22 selectively may start and stop servo motor 38, via control path 38a, thereby to transport veneer sheet 24b on conveyor section 12a into and away from work station 14. Conveyor sections 12b, 12c, 12d separately, selectively are operated—responsive to control means 22 and AC servo motors 40, 42, 44, via control paths 40a, 42a, 44a—controllably to advance and stop downstream veneer sheets 24c, 24d and continuous length of veneer 26.

Indicated generally at 46 in FIGS. 1 and 2 is a veneer sheet in-feed station. In-feed station 46 includes a pinch roller assembly 48 having upper and lower pairs, respectively, of driven and idler pinch rollers, which are suitably frame-mounted, for advancing veneer sheet 24a toward conveyor section 12a. In-feed station 46 also includes a series of skew rollers 50, which are aligned in a planar array immediately upstream of pinch roller assembly 48, for positioning a lateral edge of veneer sheet 24a against a lateral stop 46a. In-feed station 46 further includes a three horsepower, AC servo motor 52 that, responsive to control means 22, drives the upper set of pinch rollers of pinch roller assembly 48 to advance sheet 24a downstream. Finally, in-feed station 46 includes a double-action, pneumatic cylinder 54 that selectively may be actuated to prevent the feeding of veneer sheets downstream in the event of equipment failure, e.g. jamming. The piston of cylinder 54 normally is extended, as better shown in FIG. 2, to pivot the upper set of pinch rollers into a downward position frictionally to engage a veneer sheet against the lower set of pinch rollers, whereas the piston may be retracted if it is desired to stop the normal operation of in-feed station 46.

Importantly, cooperation among sensing means 20a, 20b, control means 22, in-feed station 46 and conveyor means 12 enables apparatus 10 to advance individual veneer sheets of various lengths through work stations 14, 16, 18 and to stop them at predefined positions relative thereto. Control means 22 and servo motor 52, which control the rate at which veneer sheet 24a is advanced through pinch roller assembly 48 and past sensing means 20a, 20b, also are responsive to sensing means 20a, 20b, which are disposed upstream from scarfing work station 14 and which detect the leading and trailing edges of veneer sheet 24a and sense the distance therebetween. Thus, the length of veneer sheet 24a straightforwardly may be determined by control means 22, based upon the rate of its advance and the time that elapses between detection of its leading and trailing edge. Similarly, the lengths of veneer sheets 24b, 24c, 24d previously may have been determined, as they were advanced through in-feed station 46. Those skilled in the art will appreciate that control means 22, equipped with conventional data processing and storage capability, straightforwardly can track the positions of the leading and/or trailing edges of veneer sheets 24b, 24c, 24d and continuous length of veneer 26, based upon their determined lengths and the rate at which they are advanced along apparatus 10.

Illustrating the importance of maintaining individual control over veneer sheets of various lengths, control means 22 may be programmed to advance veneer sheets 24b, 24c, via servo motors 38, 40, thereby precisely to position the leading edge of veneer sheet 24b and the trailing edge of veneer sheet 24c in scarfing work station 14. Control means 22 also may be programmed to advance veneer sheet 24d and continuous length of veneer 26, via servo motors 42, 44, thereby precisely to position the trailing edge of veneer sheet 24d in glue-applying work station 16, and the leading edge of veneer sheet 24d and the trailing edge of continuous length of veneer 26 in bonding work station 18.

Scarfing work station 14 now will be described briefly by reference to FIGS. 1 and 2. Station 14 includes scarfing means, or dual power circular saws 56, 58 mounted on a pivotable carriage arm 60a of a reciprocable carriage 60. Saws 56, 58 are inclined and rotate in substantially parallel planes, as best shown in FIG. 2, with the angle of inclination of their planes determining the angle of the scarf cuts to be made, respectively, on the leading and trailing edges of veneer sheets 24b, 24c, which occupy work station 14. As indicated by arcuate arrows in FIG. 1, the blades of saws 56, 58 counterrotate to provide a proper bite of the teeth of the blade of saw 58 with the leading edge of veneer sheet 24b and the teeth of the blade of saw 56 with the trailing edge of veneer sheet 24c. Carriage 60 is laterally reciprocable along dual, longitudinally spaced runners 62 (refer to FIG. 2), with the reciprocation occurring in synchronization with the operation of servo motors 38, 40. This synchronization, provided by control means 22, enables a precise scarf cut to be made on the leading and trailing edges of a pair of veneer sheets simultaneously occupying work station 14.

By precisely positioning veneer sheet 24b in work station 14 based upon its determined length, control means 22 and servo motor 38 render possible the scarfing of its leading edge (the terminal edge that leads veneer sheet 24b) with minimal waste. This is because the length of veneer sheet 24b and the distance it has been advanced toward scarfing work station 14 on conveyor section 12a determine the position of its unscarfed, leading edge relative to saw 58. Downstream, control means 22 and servo motor 40 advance immediately preceding veneer sheet 24c (which may have a different length from that of veneer sheet 24b) on conveyor section 12b precisely to position its trailing edge (the terminal edge that trails veneer sheet 24c) relative to saw 56 for scarfing, thereby minimizing the waste that results from the scarfing operation and maximizing the post-scarf length of veneer sheet 24c.

Once the scarfing operation is completed, veneer sheet 24c is advanced further downstream precisely to locate its leading and trailing edges relative to work stations 16, 18. Thus, the concurrent operation of scarfing work station 14 on the leading edge of one veneer sheet, e.g., veneer sheet 24b, and on the trailing edge of a preceding one of the veneer sheets in the series, e.g., veneer sheet 24c, requires only one pass of transversely reciprocable, carriage-mounted saws 56, 58, and yet it produces conforming, precisely scarfed edges of the successive veneer sheets for later joining.

Figure 3:
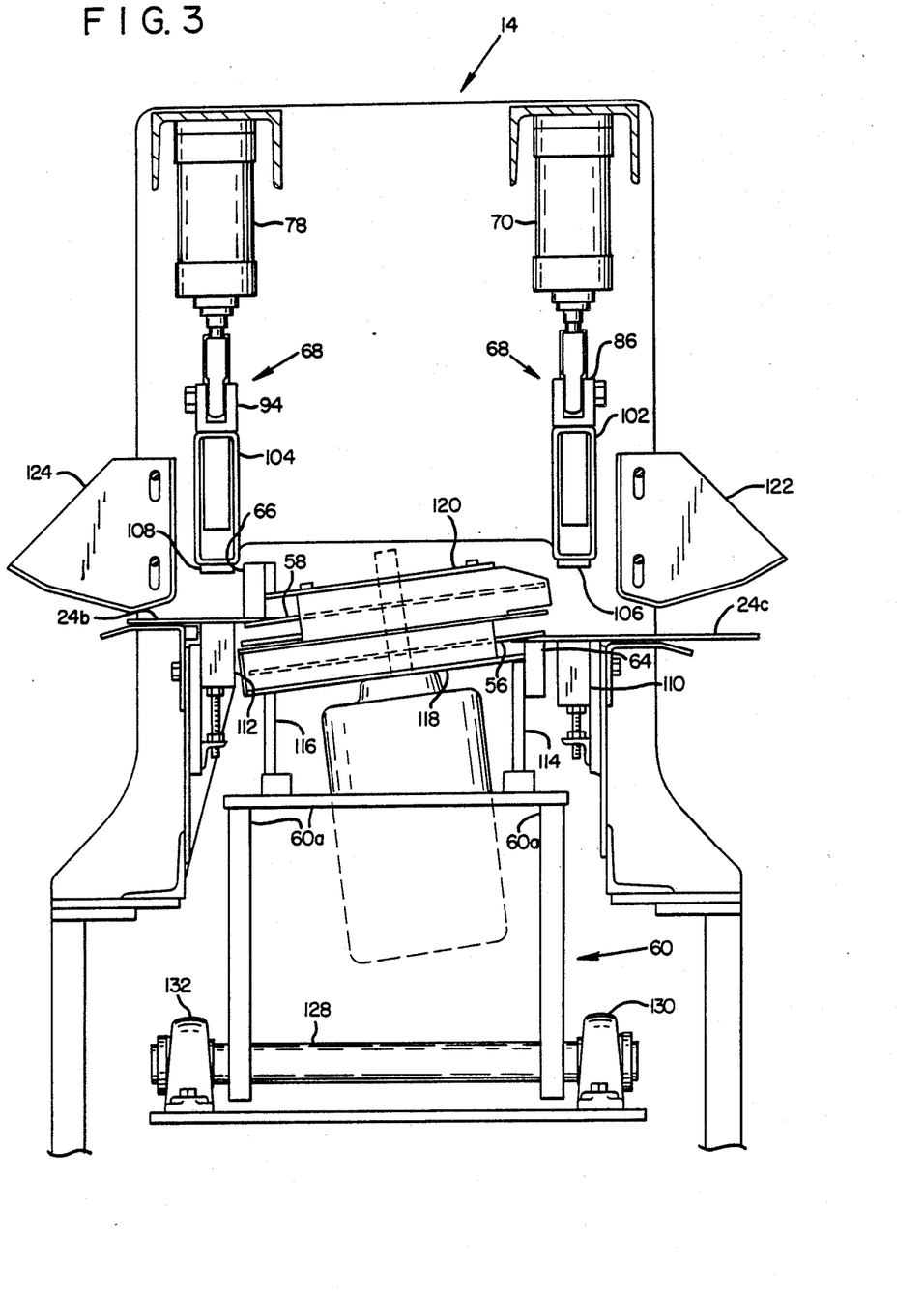
FIG. 3 is an enlarged, fragmentary side elevation of the scarfing work station, taken generally along the line 3—3 of FIG. 1, showing the dual rotating circular saws and corresponding dual veneer sheet backup plates mounted on a reciprocable carriage.

Turning now to FIGS. 3 through 7, scarfing work station 14 is described in further detail. FIG. 3 is a fragmentary side elevation taken generally along the line 3—3 of FIG. 1, and shows dual circular saws 56, 58 and a pair of corresponding dual veneer sheet backup plates 64, 66 mounted on carriage arm 60a. Scarfing work station 14 includes frame-mounted clamping means, indicated generally at 68, which includes two longitudinally spaced sets of four laterally spaced pneumatic cylinders 70, 72, 74, 76; 78, 80, 82, 84 (refer to FIGS. 6 and 7). Each cylinder has mounted to its piston (shown in a retracted position in FIG. 3) a clevis, such as cleves 86, 88, 90, 92, 94, 96, 98, 100 (refer to FIGS. 6 and 7). Laterally spaced cleves 86, 88, 90, 92 mount a downstream clamp bar 102 and laterally spaced cleves 94, 96, 98, 100 mount an upstream clamp bar 104. The lower surfaces of clamp bars 102, 104 are equipped with anti-slip laminates 106 108 for engaging the upper surface of veneer sheets 24c, 24b when the cylinders' pistons are extended. Directly beneath clamp bars 102, 104 are corresponding and opposing anvils 110, 112, which are adjustably positionable by conventional means to a height substantially equal to that of the conveyor sections on which veneer sheets 24c, 24b rest. Thus, veneer sheets 24b, 24c can be clamped near their leading and trailing edges, respectively, at a proper elevation relative to saws 58, 56 while carriage 60 laterally traverses the veneer sheets within scarfing work station 14.

An important feature of the preferred embodiment of scarfing work station 14 is shown in FIG. 3. Backup plates 64, 66 are mounted with saws 56, 58 on carriage arm 60a, and are cooperable therewith, to provide for the stabilization of the extreme trailing and leading edges, respectively, of veneer sheets 24c, 24b as the scarfing operation is performed. This structure prevents the rotating saw blades from deflecting the veneer sheets' extreme edges away from the saw blades. Backup plates 64, 66 are rigidly mounted to carriage arm 60a by mounts 114, 116, which also rigidly mount to carriage arm 60a a saw blade assembly including saws 56, 58 and corresponding saw blade housings 118, 120.

Figure 4:
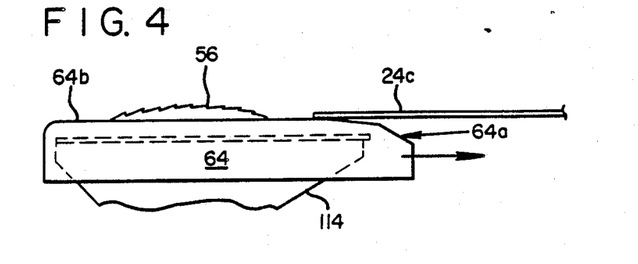
FIG. 4 is an enlarged, fragmentary front elevation of the scarfing work station, detailing one of the dual veneer sheet backup plates and its engagement with a veneer sheet.

FIG. 4 shows a front elevation of backup plate 64 on its mount 114, with plate 64 in engagement with a veneer sheet 24c, shown fragmentarily and in cross section. When carriage 60 is moved in the direction shown by the arrow in FIG. 4, plate 64 moves (from left to right in FIG. 4) underneath veneer sheet 24c immediately opposite the blade of saw 56. Plate 64 has a tapered leading edge 64a that provides for the gradual alignment of veneer sheet 24c to the plane of the top surface 64b of the plate prior to the engagement of veneer sheet 24c by saw 56. Surface 64b is, in the preferred embodiment of the invention, equipped with an anti-friction laminate to prevent marring of veneer sheet 24c and to provide for its smooth travel therealong. It will be understood that backup plate 66 is structured similarly, and mounted upside down, relative to plate 64, on mount 116.

Figure 5:
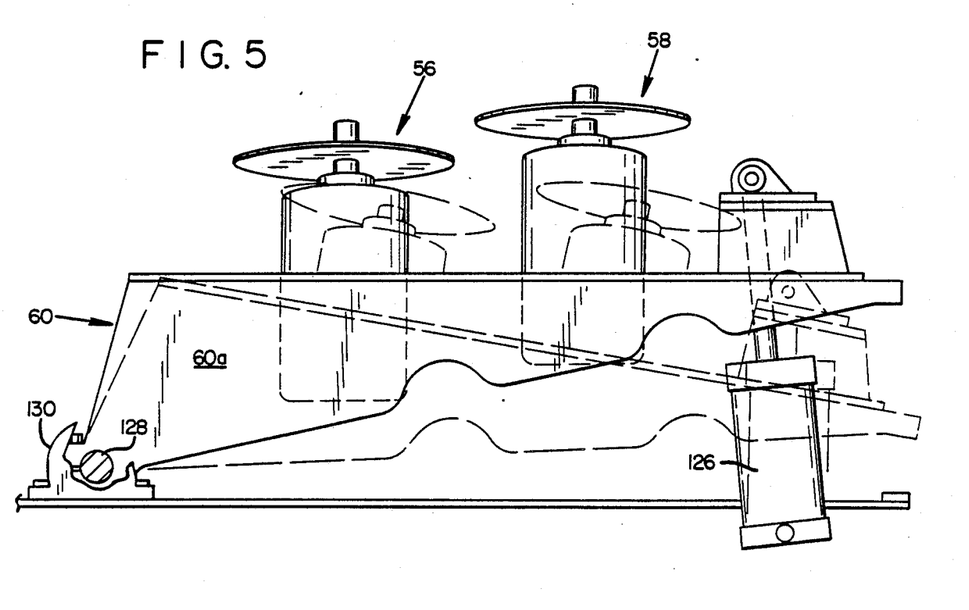
FIG. 5 is a fragmentary front elevation, taken generally along the line 5—5 of FIG. 1, and shows the up and down angular positions of the circular saws as they are reciprocated with the carriage.
Figure 6:
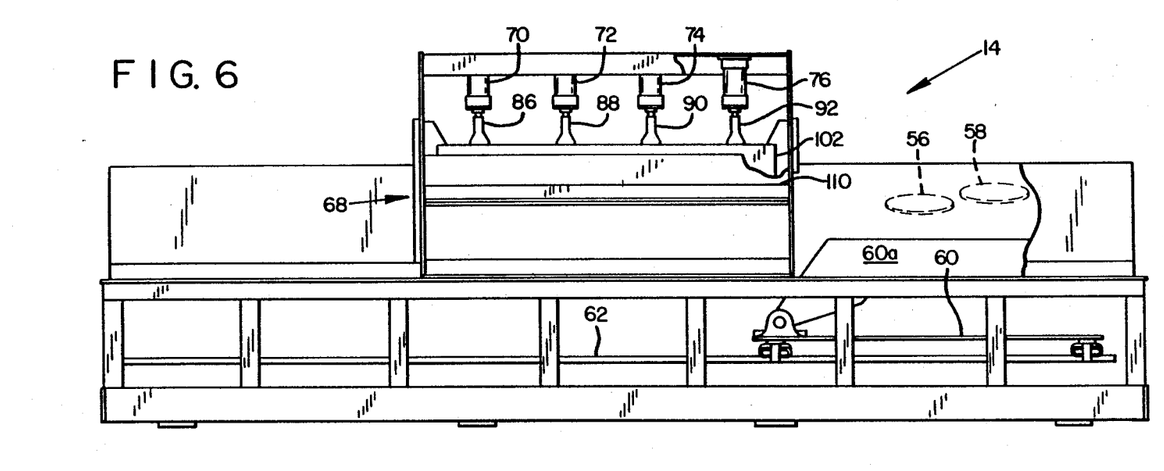
FIG. 6 is a front elevation of the scarfing work station, taken generally along the line 6—6 of FIG. 1, showing the carriage/runner assembly that mounts the circular saws.

Referring briefly to FIG. 3, it may be seen that scarfing work station 14 is equipped with an in-feed shield 122 and an out-feed shield 124. Shields 122, 124 reduce the hazard created by high-velocity wood chips or sawdust particles that might escape housings 118, 120. Arm 60a of reciprocable carriage 60 is, as shown in FIGS. 3, 5 and 6, pivotable into an upper and lower position. In the upper position of carriage arm 60a shown in FIGS. 3 and 6, and shown in solid lines in FIG. 5, saws 56, 58 are elevated to a scarfing position in which veneer sheets 24c, 24b may be scarfed.

Saws 56, 58 are in their upper position when carriage 60 is moving to the right in FIG. 5 and is in the lower position when carriage 60 is moving to the left. The pivoting of carriage arm 60a is accomplished by a pivotally carriage-mounted pneumatic cylinder 126 (refer to FIG. 5) and a shaft 128, which is rotatably mounted to carriage 60 by a pair of journal bearings 130, 132. Thus, under system control, e.g. via control means 22, cylinder 126 can be actuated in synchronization with the reciprocation of carriage 60 alternately to raise and lower saws 56, 58 to scarf veneer sheets while traversing in one direction and to be lowered out of the way while traversing in the other direction. Finally in reference to FIG. 5, it should be noted that in the preferred embodiment, saws 56, 58 are mounted to carriage arm 60a such that their motors' spindles are slightly out of parallel, i.e. with the axis of the spindle of saw 56 inclined approximately one-sixteenth inch forward of true vertical and with the axis of the spindle of saw 58 inclined approximately one-sixteenth inch rearward of true vertical, relative to the direction of their scarfing traverse of the veneer sheet edges.

Figure 7:
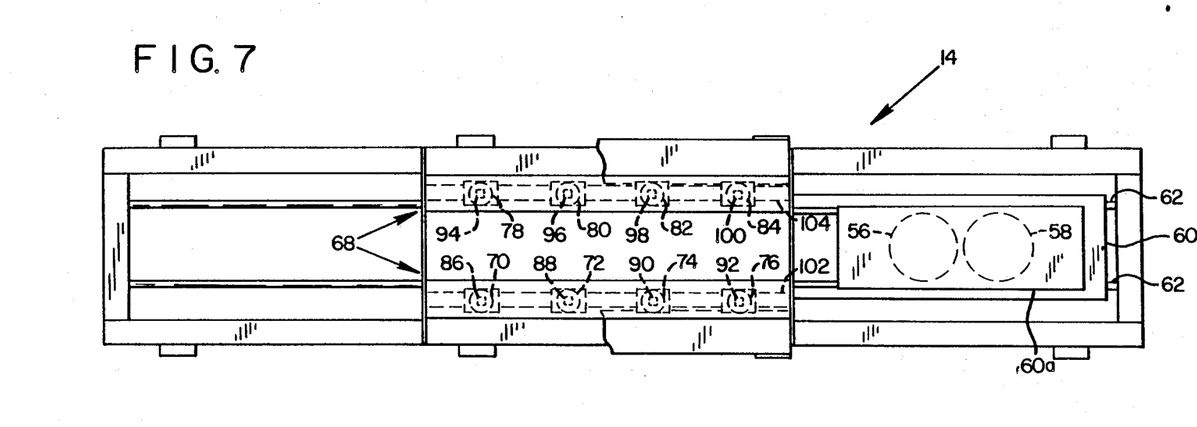
FIG. 7 is a top view of the scarfing work station corresponding to FIG. 6.

FIGS. 6 and 7 show how carriage 60 is reciprocated along runners 62 (only one of which is shown in FIG. 6). Runners 62 extend substantially the lateral extent of scarfing work station 14 and, by any suitable (preferably roller) bearing means, provide for the smooth and level travel of carriage 60 within scarfing work station 14. It will be understood that carriage 60 may be driven reciprocally by conventional means, e.g. motor and chain/sprocket, and that the reciprocating of carriage 60, the pivoting of carriage arm 60a and the operation of clamping means 68 are synchronized, by control means 22, with the advancing and stopping of veneer sheets 24b, 24c on conveyor sections 12a, 12b.

Referring again to FIGS. 1 and 2, glue-applying work station 16 and bonding work station 18 are described. Glue-applying work station 16 includes a reciprocable carriage 134, driven by conventional means, rigidly mounting glue-applying means 136 (refer to FIG. 2) having a reservoir 136a and a depending nozzle 136b. Nozzle 136b is mounted on carriage 134 in a position for applying a bead of glue on the trailing, upwardly facing, scarfed edge of veneer sheet 24d, which occupies work station 16. Glue-applying work station 16 applies glue on the trailing edge of veneer sheet 24d in one direction only, during the lateral movement of reciprocable carriage 134. In the reverse direction, a valve between reservoir 136a and nozzle 136b is closed to prevent the application of glue. It will be appreciated that control means 22, servo motor 42 and vacuum conveyor section 12c cooperate to position veneer sheet 24d precisely within glue-applying work station 16 for the duration of the glue-applying, edge-treatment operation.

Concurrent with the operation of glue-applying work station 16 on the trailing edge of veneer sheet 24d, bonding, or hot press, work station 18 is operated to bond together the leading edge of veneer sheet 24d and the trailing edge of the immediately preceding, continuous length of veneer 26 (a different veneer 'sheet'). Veneer sheet 24d and continuous length of veneer 26 are both referred to as veneer sheets when they occupy bonding station 18 as illustrated in FIGS. 1 and 2. Concurrent with the edge-treatment operation on veneer sheets 24d, 26 is the edge treatment of veneer sheets 24b, 24c occupying scarfing station 14. Concurrent with the edge-treatment operation on veneer sheets 24b, 24c in scarfing station 14 and with the edge-treatment operation on veneer sheet 26 in bonding station 18 is the edge treatment of veneer sheet 24d in glue-applying station 16. Thus, apparatus 10 may be seen to include pairs of in-line veneer edge-treatment stations, each station being constructed to perform a veneer edge-treatment operation on at least one of the opposed terminal edges of at least one veneer sheet occupying the station. Control means 22, which includes means synchronizing the operation of the stations, further controls operation of conveyor sections 12a, 12b, 12c, 12d, whereby edge-treatment operations are performed concurrently on different veneer sheets by the two stations making up each pair of stations.

Apparatus 10 also may be seen to include at least one work station, e.g. scarfing work station 14, having means for working on one of the opposed terminal edges of a veneer sheet, e.g. the leading edge of veneer sheet 24b, and another work station, e.g. glue-applying work station 16, having means for working on the opposite terminal edge of a veneer sheet, e.g. the trailing edge of veneer sheet 24d. Control means 22 control the operation of conveyor means 12, whereby one sheet in a series, e.g. veneer sheet 24b, is stopped by conveyor means 12 with its one, i.e. leading, edge properly positioned in the one, i.e. scarfing, work station for work to be performed thereon during the time that a preceding sheet in the series, e.g. veneer sheet 24d, is stopped by conveyor means 12 with its opposite, i.e. trailing, edge properly positioned in the other, i.e. glue-applying, work station for work to be performed thereon.

In the preferred embodiment of the invention, bonding work station 18 includes a stationary upper platen 138 and a vertically reciprocable lower platen 140, which may be alternately raised to press the leading edge of veneer sheet 24d and the trailing edge of continuous length of veneer 26 against upper platen 138 and lowered to release the bonded veneer. At least one of platens 138, 140 preferably is heated by conventional means, e.g. electro-resistive or electro-static means, to expedite curing of the glue applied by glue-applying work station 16.

Importantly, platens 138, 140 have opposed, planar mating surfaces that are at least co-extensive with the greatest nominal width of the veneer sheets, e.g. forty-eight inches, and are of a longitudinal dimension of approximately five inches. It is important to the operation of apparatus 10 that the bonding surface area be effective over such a longitudinal extent of apparatus 10 because the position of the leading edge of veneer sheet 24d, the trailing edge of which must be in a fixed position relative to nozzle 136b of glue-applying work station 16, may be anywhere within an approximately five-inch range around the center line of platens 138, 140. This permits the bonding in station 18 of veneer sheets, e.g. veneer sheet 24d, having post-scarf lengths of between approximately ninety-five inches and one hundred inches. The leading edge of veneer sheet 24d is positioned to align, in proper overlapped relation, with the trailing edge of continuous length of veneer 26. This is accomplished by advancing continuous length of veneer 26 on conveyor section 12d via control means 22 and servo motor 44.

The apparatus of the invention in its preferred embodiment now will be summarized. Because of their selective, independent controllability, work stations 14, 16, 18 and conveyor sections 12a, 12b, 12c, 12d may be described as being loosely coupled. The loosely coupled nature of work stations 14, 16, 18 permits the veneer sheets that occupy them to be edge treated therein independently from one another. The loosely coupled nature of the individual conveyor sections within conveyor means 12 permits veneer sheets resting thereon to be advanced and stopped independently from one another. Finally, control means 22 separately, selectively controls the operation of the work stations and conveyor means (in parallel) to effect the joinder of successive veneer sheets (in a series).

Thus, apparatus 10 simultaneously scarfs the opposite terminal edges of adjacent veneer sheets 24b, 24c in scarfing work station 14 during the time that it simultaneously applies glue to, and bonds, the opposite terminal edges of preceding veneer sheet 24d. The throughput of apparatus 10 is limited only by the cycle time of the slowest work station therein, which in the preferred embodiment is bonding station 18. Tightly coupled apparatus (e.g. apparatus having a common conveyor extending along plural, in-line work stations operated by common drive means) could provide for the concurrent edge treatment of successive veneer sheets in a series, but would be unable to handle veneer sheets of different lengths, thereby producing significant waste in the production of a continuous length of veneer. The structure and configuration of work stations and conveyor sections disclosed herein may be seen compactly to produce edge joinder of good quality at high-speed with little waste. It will be appreciated that various edge-treatment operations may, within the spirit of the invention, be combined further, e.g. glue-applying means 136 might be incorporated with scarfing work station 14 or with bonding station 18.

Apparatus 10 embodies a method of edge joining veneer sheets, including (1) transporting the veneer sheets as a series of sheets along a conveyor; (2) at an upstream location of the conveyor, scarfing the leading edge of a veneer sheet in the series and the trailing edge of a veneer sheet immediately preceding the first-mentioned sheet; (3) at a second location downstream on the conveyor from the first location, applying glue to the trailing edge of the third sheet which immediately precedes the second sheet; (4) at a location downstream from the second location, bonding the leading edge of the third sheet against the trailing edge of a fourth sheet which immediately precedes the third sheet in the series; and (5) operating the conveyor means, whereby, regardless of variations in length of prospective veneer sheets in the series, the first and second sheets are properly positioned to have the scarfing performed thereon, the third sheet is properly positioned to have glue applied thereto and the third and fourth sheets are properly positioned to have their overlapping, trailing and leading edges bonded.

Accordingly, while a preferred embodiment of the invention has been described herein, it is appreciated that modifications are possible that come within the scope of the invention.

It is claimed and desired to be secured by Letters Patent:

1. An apparatus for edge joining veneer sheets to form a continuous length of veneer comprising:

elongate conveyor means for transporting the veneer sheets as a series of sheets with opposed terminal edges leading and trailing each sheet, and plural work stations distributed along the length of said conveyor means, each work station having means for working on a terminal edge of a veneer sheet occupying the station, and the plural work stations including at least one station for working on one of said opposed terminal edges of a veneer sheet and another station for working on the opposite terminal edge of a veneer sheet;

sensing means sensing the distance between opposed terminal edges of each of successive veneer sheets in the series of sheets carried by said conveyor means; and control means responsive to said sensing means controlling operation of said conveyor means whereby one sheet in the series of sheets is stopped by said conveyor means with its said one terminal edge properly positioned in said one station for work to be performed thereon concurrently with the time that a preceding sheet in said series is stopped by said conveyor means with its said opposite terminal edge properly positioned in said other station for work to be performed thereon by said other station.

2. The apparatus of claim 1 wherein said conveyor means comprises separate selectively controlled conveyor sections for transporting veneer sheets into and away from a work station.

3. The apparatus of claim 2 wherein the conveyor sections include vacuum means operable to hold a veneer sheet on the conveyor section with the veneer sheet nondisplaceable thereon, and said sensing means is positioned upstream of the first work station of said plural stations.

4. The apparatus of claim 1 wherein said one work station includes scarfing means for scarfing the terminal edge of a veneer sheet that leads the veneer sheet and scarfing means for scarfing the terminal edge of an immediately preceding veneer sheet that trails the preceding veneer sheet, and wherein said other work station includes glue-applying means for applying glue to the terminal edge which forms a trailing edge of a veneer sheet preceding the first-mentioned and second-mentioned sheets in the series.

5. A method of edge joining veneer sheets of random length to form a continuous length of veneer comprising:

transporting the veneer sheets endwise and as a series of sheets along a conveyor;

at a first location on the conveyor determining the length of each sheet in the series;

at a second location of said conveyor downstream form the first location scarfing the leading edge of a first veneer sheet in said series and the trailing edge of a second veneer sheet immediately preceding the first sheet;

at a third location of the conveyor downstream from said second location applying glue to the trailing edge of a third sheet which immediately precedes said second sheet;

at a fourth location of the conveyor downstream from said third location bonding the leading edge of said third sheet against the trailing edge of a fourth sheet which immediately precedes said third sheet in the series; and operating said conveyor means in response to the detected length of the sheets whereby regardless of variations in length of respective veneer sheets in the series the said first and second sheets are properly positioned to have scarfing performed thereon at the same time that the third sheet is properly positioned to have glue applied thereto and at the same time the third and fourth sheets are properly positioned to have their trailing and leading edges bonded.

6. Apparatus for joining veneer sheets of random length to form a continuous length of veneer comprising:

elongate conveyor means for transporting the veneer sheets with the sheets traveling lengthwise and following one another as a series of sheets;

sensing means detecting the length of each veneer sheet transported by the conveyor means located at an upstream location on said conveyor means, plural work stations distributed along the length of the conveyor means downstream from the sensing means for working on terminal edges of sheets, and control means controlling operation of the conveyor means governed by said sensing means whereby the conveyor means repeatedly first moves all the veneer sheets with respect to the stations during one time period and then stops all the veneer sheets during another time period with the sheets on being stopped properly positioned in respective stations, said control means stopping a series of sheets with one sheet in the series having its leading edge occupying one work station at the same time that a preceding sheet in the series is stopped with its trailing edge occupying the same work station and at the same time that a further preceding sheet in the series is stopped with its trailing edge occupying another work station downstream of the first-mentioned station, the amount that said first-mentioned preceding sheet is moved being variable and depending on its detected length.

7. A method of joining veneer sheets of random lengths to form a continuous length of veneer comprising:

conveying the sheets end to end and with the sheets following one another as a series of sheets along a conveyor path, at a sensing station disposed at an upstream location in the conveying path determining the distance between end edges of each sheet in the series thus to determine the length of each sheet, performing a first work operation on the end edge of a sheet at a first work station spaced along the conveyor path from the sensing station, performing a second work operation on the end edge of a sheet at a second work station spaced along the conveyor path from the sensing station and the first work station, and performing a third work operation on the end edge of a sheet on the end edge of a sheet at a third work station spaced from said first and second work stations, the conveying of sheets occurring with the conveying of all sheets at once and with the conveying of sheets at least a sheet length to change the particular edge of a sheet occupying a particular work station and during a time period which occurs intermittently and recurrently, and the work operations being performed all at once on different sheets in the series during another time period which occurs intermittently and recurrently and with those other time periods interspersed with the first-mentioned time periods, some of the changes of sheet edges involving substituting one end edge of the sheet for its opposite end edge and in these instances the amount that the sheet is moved being variable and depending upon sensed length of sheets in the series.

* * * * *